(12) United States Patent
Banerjee et al.

(10) Patent No.: US 9,992,111 B2
(45) Date of Patent: Jun. 5, 2018

(54) ROUTER TABLE SCALING IN MODULAR PLATFORMS

(71) Applicant: Cisco Technology, Inc., San Jose, CA (US)

(72) Inventors: Ayan Banerjee, Fremont, CA (US); Raghava Sivaramu, Fremont, CA (US); Ambrish Mehta, Milpitas, CA (US); Swaminathan Narayanan, San Jose, CA (US); Shiv Saini, Fremont, CA (US); Mehak Mahajan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 15/003,217

(22) Filed: Jan. 21, 2016

(65) Prior Publication Data

US 2017/0214618 A1    Jul. 27, 2017

(51) Int. Cl.
*H04L 1/00* (2006.01)
*H04L 12/749* (2013.01)
(Continued)

(52) U.S. Cl.
CPC ............ *H04L 45/741* (2013.01); *H04L 45/74* (2013.01); *H04L 45/748* (2013.01); *H04L 49/10* (2013.01);
(Continued)

(58) Field of Classification Search
CPC .... H04B 7/00; H04J 2203/0019; H04L 12/18;
H04L 12/184; H04L 12/1845; H04L 12/185; H04L 2012/5642; H04L 2012/6416; H04L 29/06455; H04L 29/08693; H04L 29/12292; H04L 47/15; H04L 47/8806; H04L 49/201
(Continued)

(56) References Cited

U.S. PATENT DOCUMENTS 6,996,099 B1   2/2006   Kadambi et al.
7,313,666 B1   12/2007  Saminda De Silva et al.
(Continued)

OTHER PUBLICATIONS

International Search Report and Written Opinion for International Application No. PCT/US2014/063252, dated May 4, 2015, 8 pages.
(Continued)

*Primary Examiner* — Dady Chery
(74) *Attorney, Agent, or Firm* — Edell, Shapiro & Finnan, LLC

(57) ABSTRACT

In one embodiment an approach is provided to efficiently program routes on line cards and fabric modules in a modular router to avoid hot spots and thus avoid undesirable packet loss. Each fabric module includes two separate processors or application specific integrated circuits (ASICs). In another embodiment, each fabric module processor is replaced by a pair of fabric module processors arranged in series with each other, and each processor is responsible for routing only, e.g., IPv4 or IPv6 traffic. The pair of fabric module processors communicates with one another via a trunk line and any packet received at either one of the pair is passed to the other of the pair before being passed back to a line card.

19 Claims, 9 Drawing Sheets

(51) Int. Cl.
*H04L 12/745* (2013.01)
*H04L 12/933* (2013.01)
*H04L 12/931* (2013.01)
*H04L 12/741* (2013.01)
*H04L 12/947* (2013.01)
*H04L 29/12* (2006.01)

(52) U.S. Cl.
CPC ............ *H04L 49/25* (2013.01); *H04L 49/352* (2013.01); *H04L 61/6068* (2013.01)

(58) Field of Classification Search
USPC ................................ 370/310, 312, 389–392
See application file for complete search history.

(56) References Cited

U.S. PATENT DOCUMENTS

| | | |
|---|---|---|
| 2004/0073715 A1 | 4/2004 | Folkes et al. |
| 2004/0223502 A1 | 11/2004 | Wybenga et al. |
| 2005/0074003 A1 | 4/2005 | Ball et al. |
| 2005/0175010 A1* | 8/2005 | Wilson ................ H04L 12/4625 370/392 |
| 2009/0198956 A1 | 8/2009 | Arimilli et al. |
| 2011/0038375 A1 | 2/2011 | Liu et al. |
| 2011/0122889 A1 | 5/2011 | Pacella et al. |
| 2011/0228795 A1 | 9/2011 | Agrawal et al. |
| 2011/0307656 A1 | 12/2011 | Hamdi et al. |
| 2014/0244779 A1 | 8/2014 | Roitshtein et al. |
| 2015/0124633 A1 | 5/2015 | Banerjee et al. |
| 2015/0295862 A1 | 10/2015 | Banerjee et al. |
| 2015/0358702 A1* | 12/2015 | Ott ........................ H04Q 11/08 370/377 |

OTHER PUBLICATIONS

International Search Report and Written Opinion in corresponding International Application No. PCT/US2017/014218, dated May 18, 2017, 12 pages.

* cited by examiner

| ROUTE-TYPE | PROFILE-1 | PROFILE-2 |
|---|---|---|
| IPv4-LPM | 128k | 112k |
| IPv4-HOST | 50k | 45k |
| IPv6-LPM (/64) | 84k | 143k |
| IPv6-HOST | 1k | 500* |

FIG.3

| TRAFFIC TYPE | PACKET ARRIVING AT PROCESSOR FOR IPv4 ROUTING | PACKET ARRIVING AT PROCESSOR FOR IPv6 ROUTING |
|---|---|---|
| IPv4 | ROUTE THEN SWITCH | SWITCH THEN ROUTE |
| IPv6 | SWITCH THEN ROUTE | ROUTE THEN SWITCH |

FIG.7

ROUTER TABLE SCALING IN MODULAR PLATFORMS

TECHNICAL FIELD

Embodiments described herein relate to packet routing in a network.

BACKGROUND

Modular routers comprise external facing line cards (LCs) that are interconnected with a plurality of internal fabric modules (FMs). In a typical implementation, each LC is interconnected with each FM such that a packet received at a given port on a given LC can be passed to any FM and then sent out of, or transmitted from, any port on the given LC or any other LC. In this way, a router can effectively route a packet, using an appropriate forwarding engine or table stored in the respective LCs and/or FMs. That is, when a packet is received at a LC and the packet can be routed based on a routing table in the LC, the packet may be routed locally (i.e., by the receiving LC) and transmitted toward a next hop in a network (e.g., another router or final destination). If the routing table stored in the LC cannot route the packet, the packet may be forwarded to a FM. The fabric module may store its own separate routing tables, where the routing tables stored in the FMs may complement the routing tables stored in the LCs. Once routing is performed on the packet within a FM, the packet may be redirected to a LC for transmission to the next hop.

BRIEF DESCRIPTION OF THE DRAWINGS

FIG. 3 is a table depicting different profiles by which Internet Protocol (IP) v4 and IPv6 forwarding table space can be allocated according to an example embodiment.

FIG. 7 is a chart depicting how a given packet received at a fabric module may be treated.

DESCRIPTION OF EXAMPLE EMBODIMENTS

Overview

In one embodiment described herein there is provided an apparatus, such as a router, that includes a chassis, a plurality of line cards disposed in the chassis and configured to be in communication with a network, each line card comprising at least two line card processors each comprising a memory storing first routes for routing a packet, and a plurality of fabric modules disposed in the chassis and communicatively coupled to the plurality of line cards, each fabric module comprising at least two fabric module processors each comprising a memory storing second routes for routing the packet, wherein the first routes are different from the second routes.

In another embodiment described herein there is provided a method including receiving a packet at a line card of a router, the packet conforming to one of a first addressing scheme or a second addressing scheme, passing the packet to a fabric module of the router, the fabric module comprising a routing engine, the routing engine comprising a first fabric module processor storing routes to route packets conforming to the first addressing scheme and a second fabric module processor storing routes to route packets conforming to the second addressing scheme; and when the packet conforms to the first addressing scheme and is received at the first fabric module processor, performing routing on the packet by the first fabric module processor and switching the packet to the second fabric module processor for forwarding back to the line card or another line card, and when the packet conforms to the second addressing scheme and is received at the first fabric module processor, switching the packet to the second fabric module processor and performing routing on the packet by the second fabric module processor, and forwarding the packet to the line card or the another line card.

Example Embodiments

Figure 1:
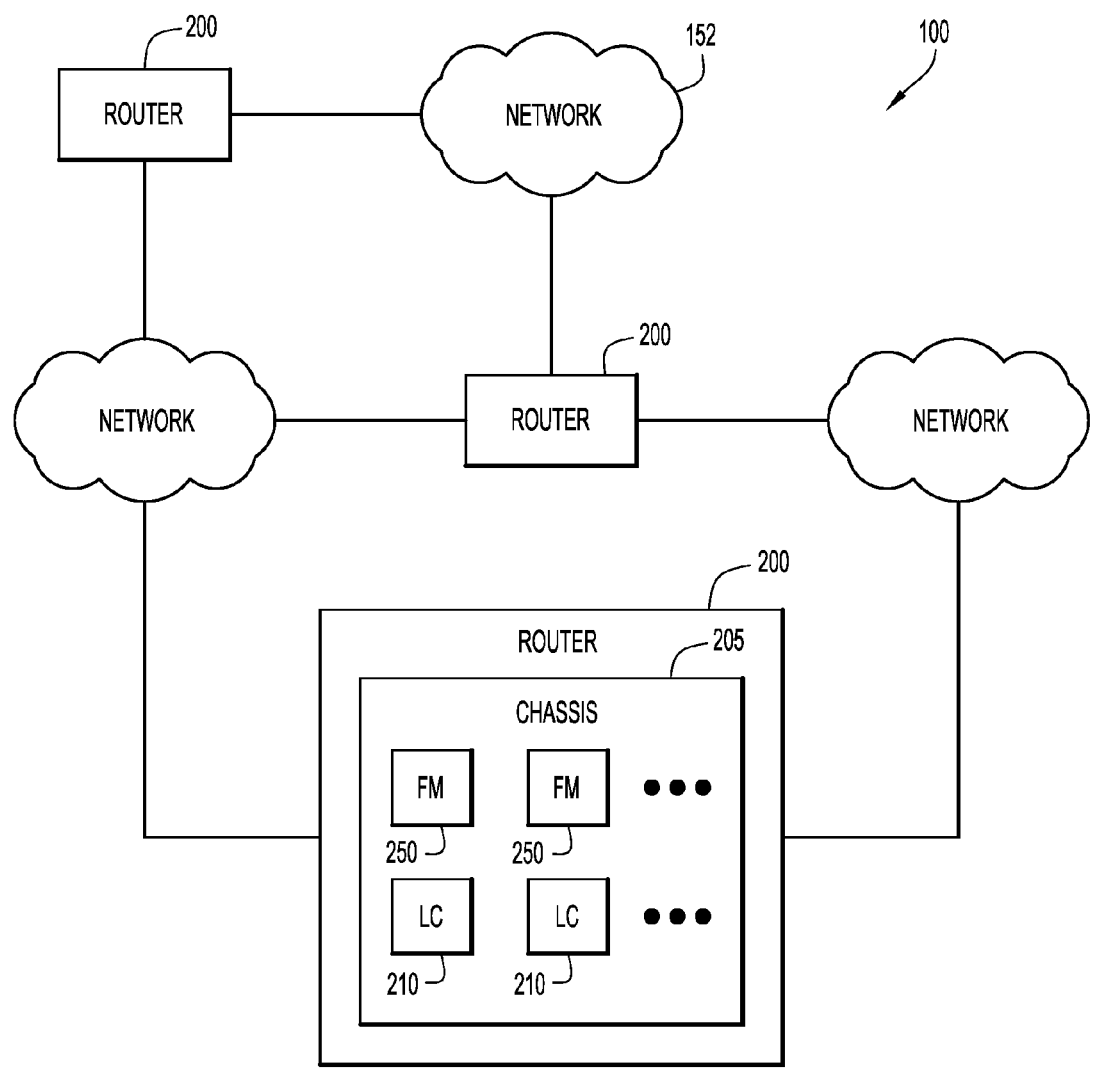
FIG. 1 depicts a network topology in which a router configured according to an example embodiment may be deployed.

FIG. 1 depicts a network topology in which a router configured according to an example embodiment may be deployed. As shown in the drawing, routers 200 interconnect respective data networks 150, 152, 154. In certain present day implementations, data packets may be communicated from one endpoint to another endpoint using Internet Protocol (IP) addressing. There are currently two "flavors" of the Internet Protocol, namely IPv4 and IPv6. Among other differences, IPv6 has increased address space enabling an increased number of uniquely addressable endpoints compared to the number of uniquely addressable endpoints supported by IPv4. Routers 200 are configured to route or forward both IPv4 and IPv6 packets. As further shown in FIG. 1, a given router 200 may be a modular router comprising a chassis 205 that is configured to host a plurality of physical line cards (LCs) 210 and a plurality of physical fabric modules (FMs) 250.

There are, however, limitations in conventional modular data packet routing and switching technologies. One limitation is that a forwarding engine (comprising routing tables in the FMs and/or LCs) is programmed identically across all cards, and thus a scale of a given router is limited to a table size of the single forwarding engine. Another limitation is that, in network platforms, forwarding tables may be programmed symmetrically on all forwarding engines.

Figure 2:
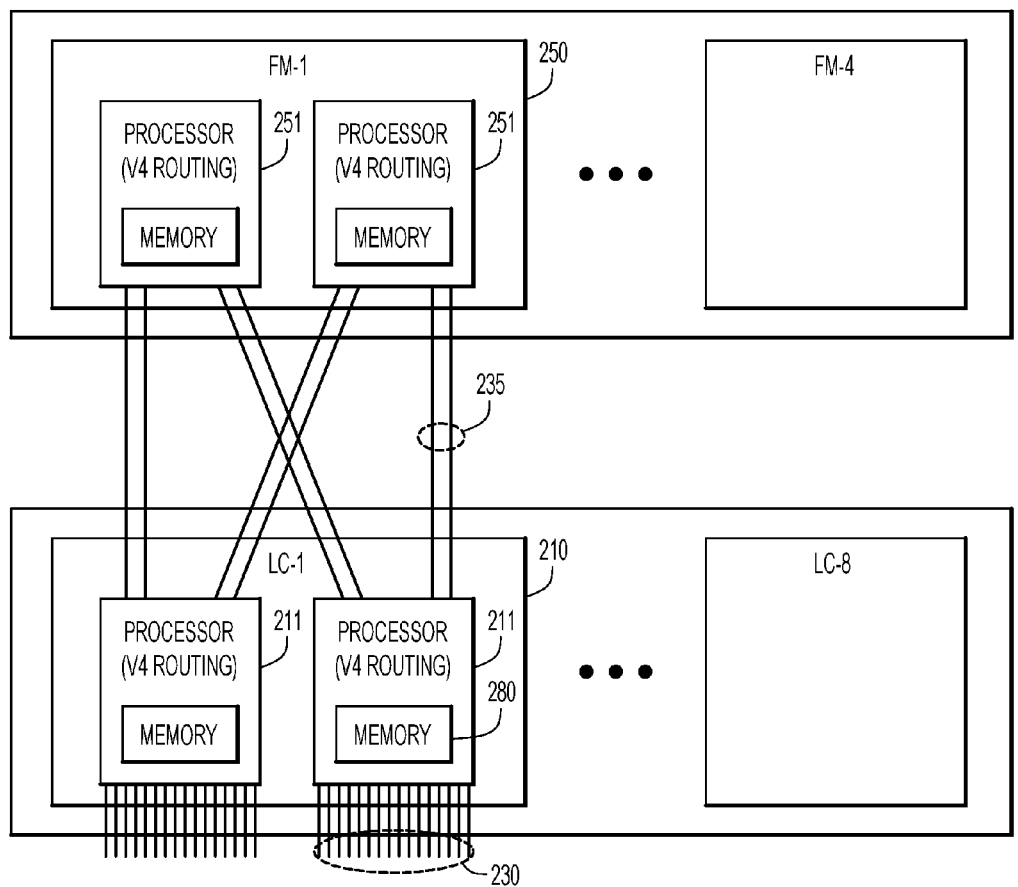
FIG. 2 depicts a schematic view of a router with modular line cards and fabric modules according to an example embodiment.

FIG. 2 depicts a router 200 with modular line cards (LCs) 210 and fabric modules (FMs) 250 according to an example embodiment. As shown, each LC 210, in the depicted implementation, includes two separate integrated circuit chips 211 each having, e.g., 32 ports. Each FM 250, in the depicted implementation, also includes two separate integrated circuit chips 251. Each of the integrated circuit chips may include memory 280 integrally fabricated therewith and/or accessible thereto via a bus (not shown). In one implementation, chassis 205 of router 200 includes eight line cards 210 (for a total of 16 LC chips 211) and four FMs 250 (for a total of eight FM chips 251).

LC 211 chips and FM chips 251 depicted in FIG. 2 may be, e.g., BCM56960 application specific integrated circuits (ASICs) chips manufactured by Broadcom, Irving, Calif., or any like ASIC or processor with similar functionality and sufficient ports. In the instant implementation, each chip includes 32 ports. In the depicted example embodiment, 16 ports on each LC chip 211 are employed as externally facing ports 230 and interconnect with a given network, e.g., network 150, 152 and/or 154. The other 16 ports on each LC chip 211 are in communication with each of the FMs 250 via links 235. More specifically, as shown in FIG. 2, each LC chip 211 has two ports connected to each FM chip 251 on each FM 250. With four FMs 250, each having two FM chips 251, each LC chip 211 can be connected to each FM chip 251 (2 ports of each LC chip 211 connected to each of the eight FM chips 251). In an embodiment, externally facing ports 230 support 100 gigabit connectivity, and links 235 support 106 gigabit connectivity.

As will be explained more fully below, LC chips 211 and FM chips 251 are loaded with routing or forwarding tables in particular ways to support the routing of IPv4 and IPv6 communications traffic through router 200. At a high level, LC chips 211 and FM chips 251 are configured such that all or most of the IPv4 and IPv6 host address space is loaded or programmed on LC chips 211 and the less precise longest prefix match (LPM) address space for IPv4 and for IPv6 is loaded or programmed on FM chips 251. In this way, when a packet or frame is received at a give LC chip 211, it is possible that the packet or frame can be routed without having to be passed to the FMs 250, thus reducing latency. In addition, to the extent the volume of IPv4 versus IPv6 traffic is known at a given node, it is possible to dedicate certain FMs 250 to predetermined types of traffic. More specifically, selected FMs of the eight FM chips 251 can be assigned to handle either IPv4 or IPv6 traffic exclusively such that one of the following possible IPv4:IPv6 chip ratios results: 1:7, 2:6, 3:5, 4:4, 5:3, 6:2 or 7:1. Knowing a priori the type of traffic that a given router 200 might handle can help to decide which ratio might be most suitable in a given application.

Reference is now made to FIG. 3, which is a table depicting different profiles by which IPv4 and IPv6 forwarding table space can be allocated among the LC chips 211 and FM chips 251 according to an example embodiment. Two profiles are presented, but those skilled in the art will appreciate that other profiles by which IPv4 and IPv6 forwarding table space can be allocated are possible.

Figure 4A:
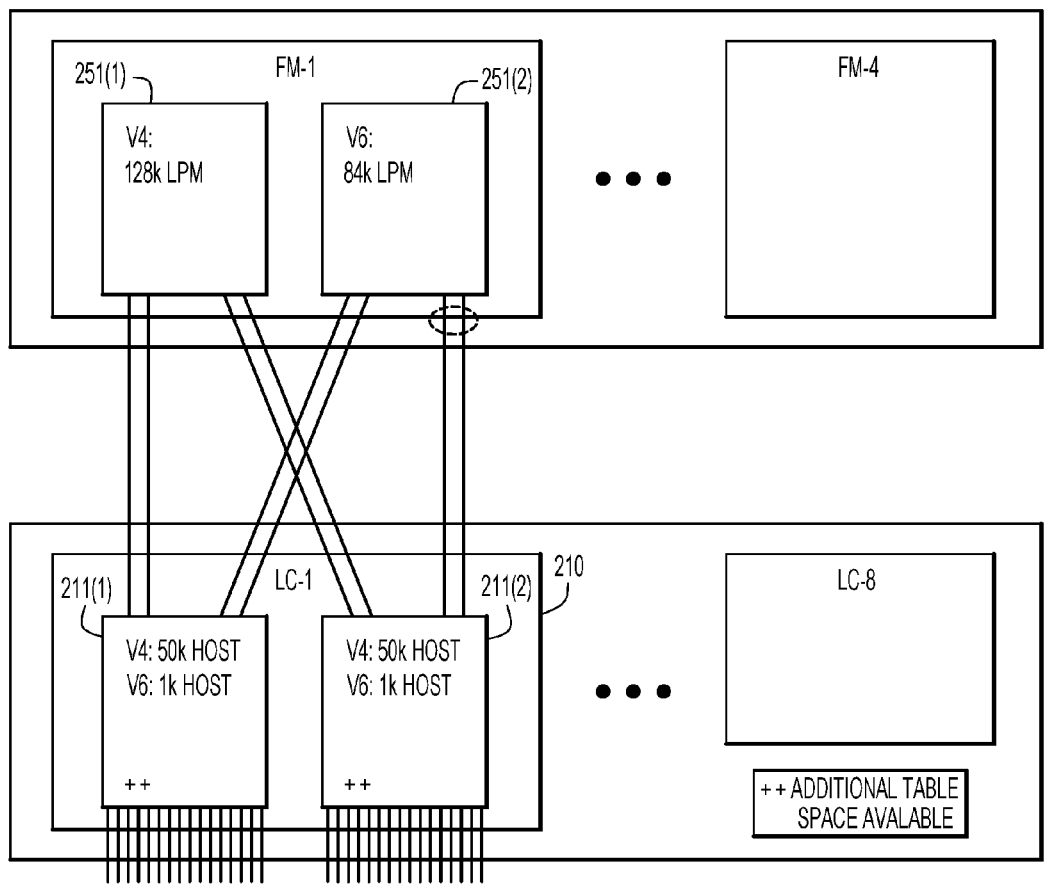
FIGS. 4A and 4B depict how the profiles set forth in FIG. 3 can be allocated across the line cards and fabric modules in the modular router according to an example embodiment.

As shown in FIG. 3, two types of address spaces are allocated in a particular manner to ensure sufficient routing table space to handle the IPv4 and IPv6 traffic. For example, Profile-1 allocates traffic as follows: 128 k IPv4-LPM (/31) routes (with the "/" slash denoting Classless Inter-Domain Routing (CIDR) notation), 50K IPv4-Host (/32) routes, 84K IPv6-LPM (/64) routes and 1 k IPv6-Host (/128) routes. The allocations of Profile-1 are depicted in FIG. 4A. Note that LC chips and FM chips 251, as a result of memory constraints, can hold up to, e.g., (a) 128K LPM IPv4 routes, (b) 84K IPv6 LPM, or (c) host-entries. As will be seen, since at least some of the profiles have route scales that are larger than the capacity of a given FM chip 251, some part of the routing table is stored in a LC chip 211 that has capacity. One approach in accordance with the embodiments described herein is to place as many LPM routes on the FM chips 251 and keep host routes on the LC chips 211. Thus, in the case of Profile-1 depicted in FIG. 4A, FM chip 251(1) includes 128K of IPv4 LPM routes, and FM chip 251(2) includes 84K of IPv6 LPM routes. LC chips 211(1) and 211(2) include 50K of IPv4 host routes and 1 k IPv6 host routes. Additional space is available on LC chips 211(1) and 211(2).

Figure 4B:
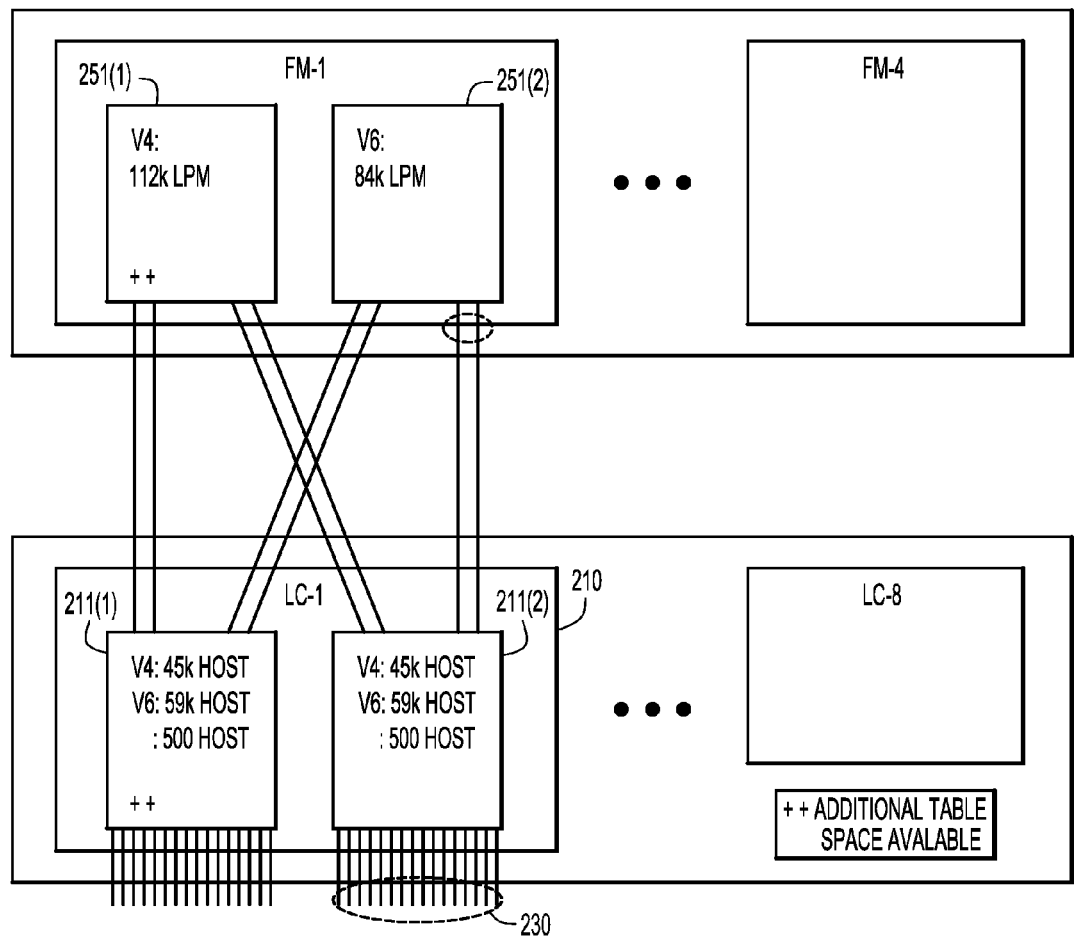

Profile-2 of FIG. 3 is depicted in FIG. 4B. In the case of Profile-2, FM chip 251(1) includes 112K of IPv4 LPM routes, and FM chip 251(2) includes 84K of IPv6 LPM routes. LC chips 221(1) and 211(2) are symmetric and include 45K IPv4 host routes, 59K IPv6 LPM routes and 500 IPv6 host routes. Additional space is available on LC chips 211(1) and 211(2) in the case of the implementation of Profile-2.

Thus, as one of ordinary skill in the art will appreciate, it is possible in accordance with the embodiments described herein to allocate routes across the available chips in LCs 210 and FMs 250 in several different ways. The allocations can be based on a priori knowledge of traffic flows through a given router 200, with a goal being to have most, if not all, IPv4 and IPv6 host routes stored on LCs 211 so that the most direct route for an incoming given frame or packet can be routed without even having to access an FM 250.

And, in an effort to further account for likely traffic flow, and avoid the potential for dropped packets as a result of "hot spots" due to traffic overload, the total of eight FM chips 251 in a given chassis 205 can be separately designated to handle only IPv4 or IPv6 traffic. Specifically, the eight FM chips 251 can be assigned to operate exclusively on IPv4 or IPv6 traffic in the following possible IPv4:IPv6 FM chip ratios: 1:7, 2:6, 3:5, 4:4, 5:3, 6:2 or 7:1. Thus, taking as an example the 1:7 ratio, one FM chip (out of the eight) can be designated to handle all IPv4 traffic routing, while the other seven FM chips can be designated to route IPv6 traffic.

When given FM chips 251 are dedicated to a given type of traffic, then LCs 210 are configured to determine whether a received packet or frame is IPv4 or IPv6 traffic and accordingly forward that packet or frame to the appropriate dedicated FM chip 251. However, where a give type of traffic begins to overload the dedicated FM chips, packets may be dropped.

Figure 5:
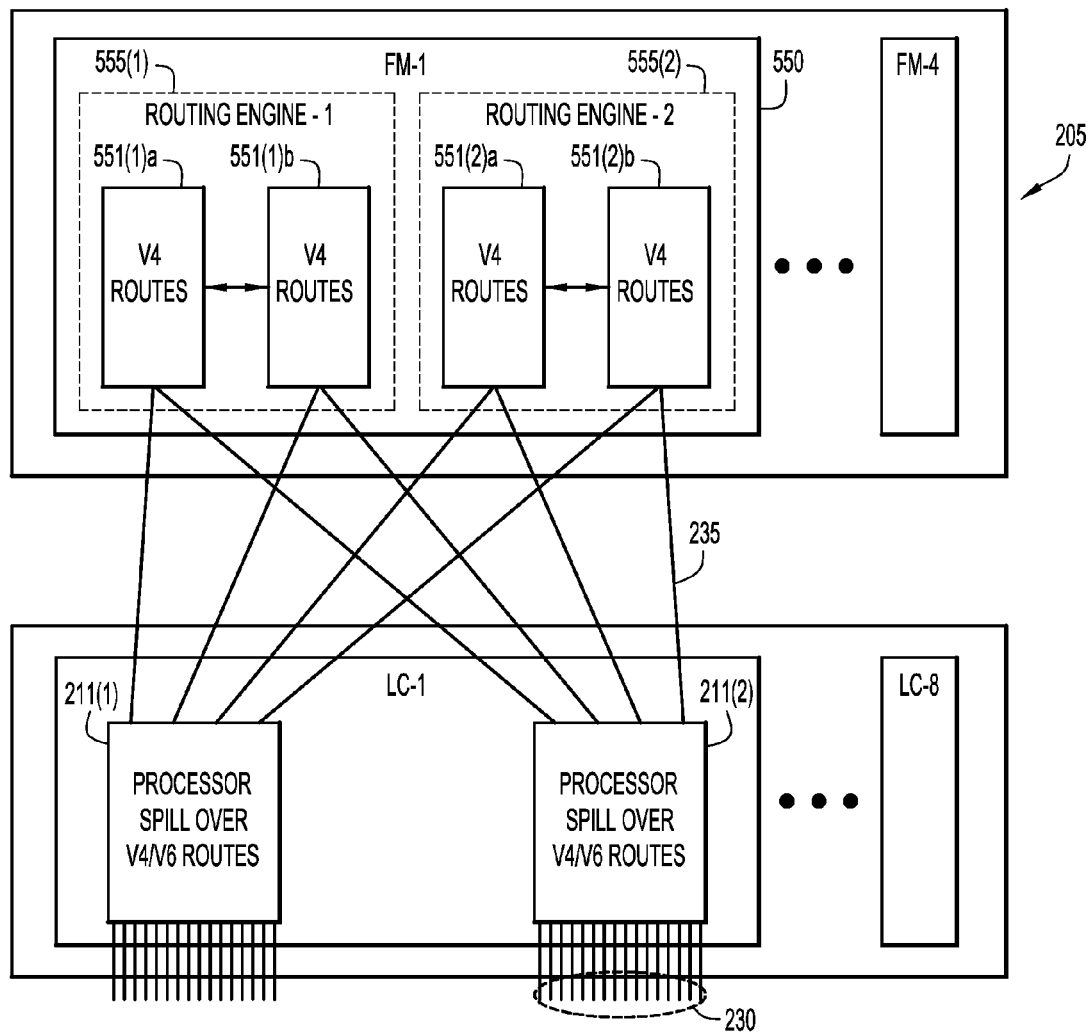
FIG. 5 depicts another implementation of a router including a fabric module having four separate chips according to an example embodiment.

FIG. 5 depicts another implementation for components for a router 500 including a fabric module 550 having four separate chips (e.g., ASICs) according to an example embodiment. This embodiment can have the effect of addressing the hot spot issue noted above. More specifically, in accordance with the instant embodiment, each router chassis 205 includes eight LCs 211, each comprising two chips 211(1), 211(2). This is the same LC configuration as shown in, e.g., FIG. 2. Each FM 550, however, comprises four individual chips 551(1)a, 551(1)b, 551(2)a, 551(2)b. As also shown in FIG. 5, the four chips in FM 250 are paired together into two routing engines 555(1), 555(2).

In the depicted embodiment, FM chip 551(1)a stores only IPv4 routes, and FM chip 551(1)b stores only IPv6 routes. Similarly, FM chip 551(2)a stores only IPv4 routes, and FM chip 551(2)b stores only IPv6 routes. Moreover, in a particular implementation, routing engines 555(1), 555(2) are programmed identically, i.e., the same IPv4 routes are programmed in all chips designated to route IPv4 traffic, and the same IPv6 routes are programmed in all chips designated to route IPv6 traffic. Thus, in the example depicted in FIG. 5, FM chips 551(1)a and 551(2)a store, or are programmed with, the same IPv4 routes, and FM chips 551(1)b and 551(2)b store, or are programmed with, the same IPv6 routes. Where there are additional routes that cannot fit on the FM chips due to memory constraints, such "spillover" routes may be programmed on LC chips 211(1), 211(2).

LCs 211(1), 211(2) each have 16 externally facing ports in communication with a network, and 16 ports that are respectively communicatively coupled with each FM chip. As in FIG. 2, a given chassis 205 is configured to host four FMs 550. Each FM 550, in the embodiment shown in FIG. 5 includes four FM chips for a total of 16 FM chips. Thus, each LC chip 211(1), 211(2) is connected to each one of the FM chips 551(1)a, 551(1)b, 551(2)a, 551(2)b, etc. via a single respective port.

In the instant embodiment, the paired FM chips in a given routing engine 555(1) or 555(2) are communicatively coupled to one another via a trunk 510(1), 510(2) using each of the remaining 16 ports (i.e., the ports not connected to LC chips 211(1), 211(2)). Trunks 510(1), 510(2) may be a high speed 106G links.

Figure 6:
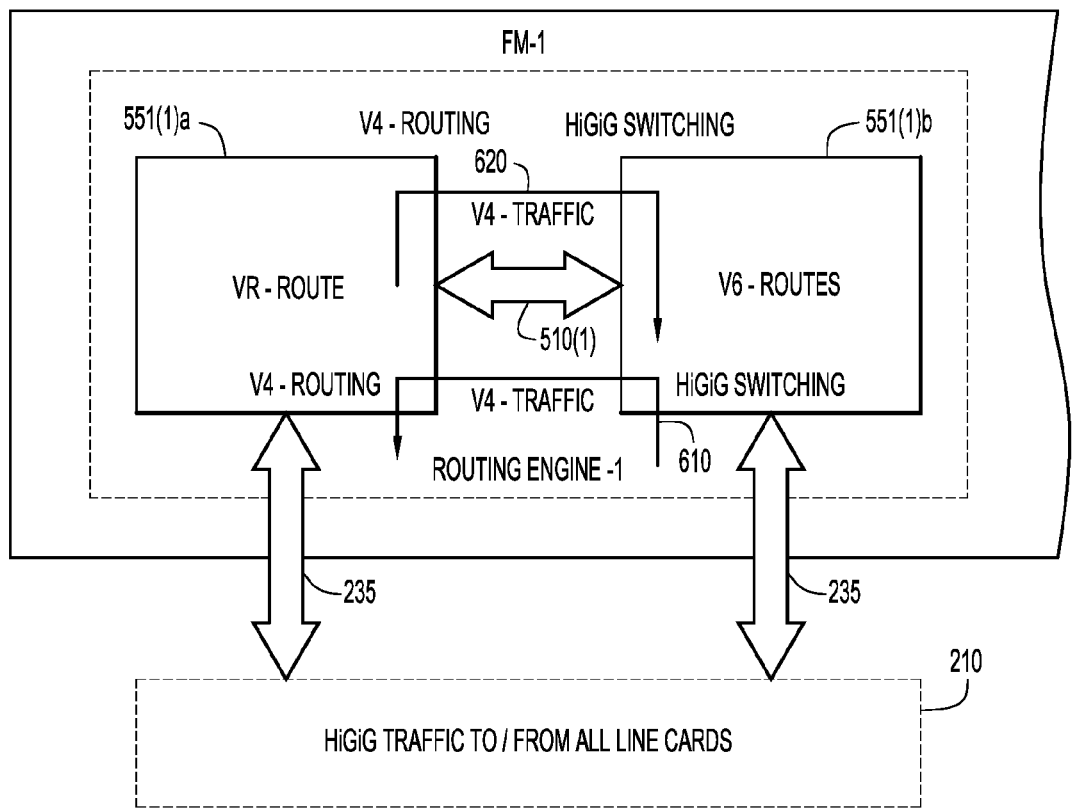
FIG. 6 depicts the flow of packets through a fabric module having four separate chips according to an example embodiment.

FIG. 6 depicts the flow of packets or frames through one routing engine 555(1), which includes FM chips 551(1)a, 551(1)b according to an example embodiment. FM chips 551(1)a, 551(1)b are respectively in communication with LCs 210 via high speed 106G single port links 235. In one implementation, as a result of load balancing techniques, any packet or frame received at a LC 210 can be forwarded to any FM chip. As a result, both IPv4 and IPv6 traffic can be sent to any FM chip. Accordingly, the instant embodiment is configured such that all traffic received at a FM 550 from any LC 210 is passed through both FM chips 551(1)a, 551(1)b to ensure that proper routing (e.g., IPv4 or IPv6 as the case may be) can be performed. For example, assume an IPv4 packet is received at FM chip 551(1)(b) (which stores IPv6 routes). That packet is switched over to FM chip 551(1)a for routing and then passed back to a selected LC 210. If the received packet is an IPv6 packet, then FM chip 551(1)b will first perform routing for the packet and then pass the packet to FM chip 551(1)a, which will merely pass the packet back to a selected LC 210. FIG. 6 expressly depicts IPv4 traffic passing both ways 610, 620 between FM chips 551(1)a, 551(1)b via trunk 510(1). Those skilled in the art will appreciate that IPv6 traffic passes between FM chips 551(1)a, 551(1)b in the same manner, and that FM chip 551(1)b (which stores IPv6 routes) will perform routing for the packet, or will switch an IPv4 packet to FM chip 551(1)a for routing.

In sum, and as explained with respect to the first described embodiment, a modular router can be implemented such that all (or most) host routes (both IPv4 and IPv6) are programmed in the LCs, and that all (or most) longest prefix match (LPM) routes (both IPv4 and IPv6) are programmed in the FMs. Such an embodiment enables particular efficiencies in routing, and with two chips available for each FM, expanded routing tables can be achieved.

In the second described embodiment, a further enhancement is made to a hierarchical routing methodology. In this second embodiment, all (or most) host routes are programmed in the LCs as in the first embodiment. However, instead of having two chips or ASICs per FM, four chips or ASICs are provided and pairs of chips are coupled together in series, with each chip programmed with IPv4 (LPM) routes or IPv6 (LPM) routes.

By programming V4-LPM routes on the "a" chips and V6-LPM routes on the "b" chips it is possible to scale up to 3 times the routing space capacity compared to a configuration having only a single chip in a given FM. As explained above, the traffic flow is such that if traffic arrives from LCs to FM chip 551(1)a, it is always forwarded on the inter-connect link to FM chip 551(1)b and vice versa. This ensures that there is no traffic over-subscription on the inter-connect links. The lookups will take place as a "bridge/route" or "route/bridge" flow depending on the route being present in the first block or the second block. That is, depending on whether the received traffic is IPv4 or IPv6 and depending at which chip the traffic arrives, the traffic will be routed (using the programmed route tables) then switched (bridged) to the other chip for egress to a LC, or switched (bridged) to the other chip where it will be routed (using the programmed route tables) then sent for egress toward a LC.

It is noted that the foregoing method can be extended by increasing the number of chips in series and programming routes appropriately to have a much larger table capacity.

FIG. 7 is a chart depicting how a given packet received at a fabric module in accordance with the embodiments described herein may be treated. As mentioned, presently, IP traffic comes in two flavors, IPv4 and IPv6, and as explained above, such traffic is handled differently depending on whether it is received at a FM chip that stores IPv4 routes or IPv6 routes. The treatment of a packet or frame by a given routing engine, e.g., 555(1) is set forth in FIG. 7. Taking an IPv4 packet first as an example, if such an IPv4 packet arrives at a processor (e.g., FM chip/ASIC) that is programmed to route IPv4 traffic, the packet is routed by that processor and then switched to the processor (FM chip/ASIC) that is programmed to route IPv6 traffic. If an IPv4 packet arrives at a processor that is programmed to route IPv6 traffic, the packet is switched to the processor that is programmed to route IPv4 traffic.

When a packet consistent with IPv6 addressing arrives at a processor that is programmed to route IPv4 traffic, the packet is switched to a processor that is programmed to route IPv6 traffic. If an IPv6 arrives at a processor that is programmed to route IPv6 traffic, the packet is routed and then switched to the processor that is programmed to route IPv4 traffic.

Thus, as can be seen, all traffic that reaches a routing engine, e.g., 555(1) in a FM is passed through each FM chip in that routing engine in a serial manner. One chip (or ASIC/processor) will perform routing on the packet, while the other will merely switch the packet to the other FM chip within the routing engine, or will switch the routed packet to a given LC.

Figure 8:
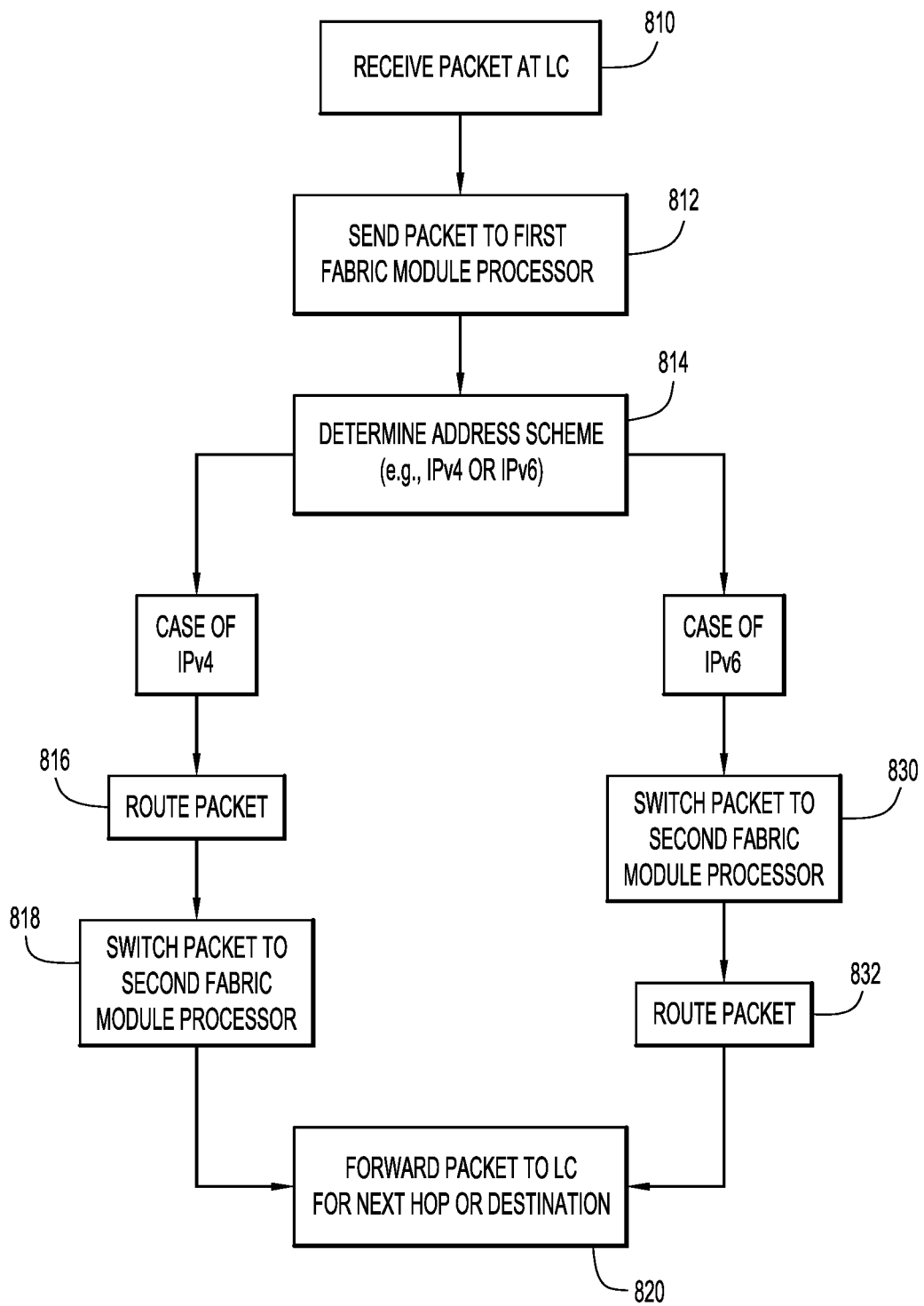
FIG. 8 is another example flow chart depicting several operations for performing packet routing according to an example embodiment.

FIG. 8 is an example flow chart depicting several operations for performing packet routing according to an example embodiment. Methodology 800 begins at 810 where a packet or frame is received at a line card. At 812, the line card passes the packet to a first fabric module processor. At 814, it is determined which address is being employed for the packet, e.g., the IPv4 or IPv6 addressing scheme. Assuming the packet is received at a fabric module processor programmed to route IPv4 traffic, at 816, packet routing is performed. At 818, the packet is switched to a paired second fabric module processor (e.g., one programmed to route IPv6 traffic). At 820 the packet is forwarded from the second fabric module processor to either the line card from which the packet was originally received or to another line card.

If, at 814, it was determined that the packet was addressed using the IPv6 addressing scheme, then at 830 the packet is switched to the second fabric module processor and, at 832, the packet routing is performed at the second fabric module processor. The packet is thereafter forwarded from the second fabric module processor to either the line card from which the packet was originally received or to another line card.

In the embodiments described herein the processors 211, 251, 551(1)a, etc. may be, for example, microprocessors or microcontrollers that execute instructions for implementing the processes described herein. Memory 280 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 280 may comprise one or more tangible (non-transitory) computer readable storage media (e.g., a memory device) encoded with software comprising computer executable instructions and when the software is executed (by, e.g., processor 211) is operable to perform the operations described herein.

In sum, there is provided an approach to efficiently program routes on LCs and FMs in a modular router to avoid hot spots and thus avoid undesirable packet loss. There is also provided a unique architecture by which each FM chip or processor is replaced by a pair of FM chips arranged in series. Each FM chip is responsible for routing, e.g., IPv4 or IPv6 traffic. The pair of FM chips communicates with another via a trunk and any packet received at either one of the pair is passed to the other of the pair before being passed back to a line card.

More specifically, an apparatus includes a chassis, a plurality of line cards disposed in the chassis and configured to be in communication with a network, each line card comprising at least two line card processors each comprising a memory storing first routes for routing a packet; and a plurality of fabric modules disposed in the chassis and communicatively coupled to the plurality of line cards, each fabric module comprising at least two fabric module processors each comprising a memory storing second routes for routing the packet, wherein the first routes are different from the second routes. In one implementation, the memory of one of the at least two fabric modules is programmed with only Internet Protocol (IP) v4 routes, and the memory of the other of the at least two fabric modules is programmed with only IPv6 routes.

In another embodiment, a method includes receiving a packet at a line card of a router, the packet conforming to one of a first addressing scheme or a second addressing scheme, passing the packet to a fabric module of the router, the fabric module comprising a routing engine, the routing engine comprising a first fabric module processor storing routes to route packets conforming to the first addressing scheme and a second fabric module processor storing routes to route packets conforming to the second addressing scheme, when the packet conforms to the first addressing scheme and is received at the first fabric module processor, performing routing on the packet by the first fabric module processor and switching the packet to the second fabric module processor for forwarding back to the line card or another line card, and when the packet conforms to the second addressing scheme and is received at the first fabric module processor, switching the packet to the second fabric module processor and performing routing on the first packet by the second fabric module processor, and forwarding the packet the line card or the another line card.

In still another embodiment, there is provided an apparatus including a chassis, a line card, disposed in the chassis, and a fabric module, disposed in the chassis and in communication with the line card, comprising a routing engine including a memory, the routing engine comprising a first fabric module processor storing routes to route packets conforming to a first addressing scheme and a second fabric module processor storing routes to route packets conforming to a second addressing scheme, the fabric module configured to, when a packet received at the line card and passed to the fabric module conforms to the first addressing scheme and is received at the first fabric module processor, perform routing on the packet by the first fabric module processor and switch the packet to the second fabric module processor for forwarding back to the line card or another line card, and the fabric module configured to, when the packet conforms to the second addressing scheme and is received at the first fabric module processor, switch the packet to the second fabric module processor and perform routing on the packet by the second fabric module processor, and forward the packet to the line card or the another line card.

The above description is intended by way of example only. Various modifications and structural changes may be made therein without departing from the scope of the concepts described herein and within the scope and range of equivalents of the claims.

What is claimed is:

1. An apparatus comprising:
   a chassis;
   a plurality of line cards disposed in the chassis and configured to be in communication with a network, each line card comprising at least two line card processors each comprising a memory storing first routes for routing a packet; and
   a plurality of fabric modules disposed in the chassis and communicatively coupled to the plurality of line cards, each fabric module comprising at least two fabric module processors each comprising a memory storing second routes for routing the packet,
   wherein the first routes are different from the second routes, and
   wherein the apparatus comprises four fabric modules, including a total of eight fabric module processors and the fabric module processors are configured to route Internet Protocol (IP) v4 and IPv6 packets in one of the following ratios: 1:7, 2:6, 3:5, 4:4, 5:3, 6:2 or 7:1.

2. The apparatus of claim 1, wherein the first routes comprise host routes and the second routes do not comprise host routes.

3. The apparatus of claim 1, wherein the second routes comprise only longest prefix match (LPM) routes.

4. The apparatus of claim 1, wherein at least two fabric module processors store the same second routes.

5. The apparatus of claim 1, wherein the memory of one of the at least two fabric processors is programmed with only Internet Protocol (IP) v4 routes, and the memory of the other of the at least two fabric processors is programmed with only IPv6 routes.

6. The apparatus of claim 1, comprising eight line cards.

7. A method comprising:
   receiving a packet at a line card of a router, the packet conforming to one of a first addressing scheme or a second addressing scheme;
   passing the packet to a fabric module of the router, the fabric module comprising a routing engine, the routing engine comprising a first fabric module processor storing routes to route packets conforming to the first addressing scheme and a second fabric module processor storing routes to route packets conforming to the second addressing scheme;
   when the packet conforms to the first addressing scheme and is received at the first fabric module processor, performing routing on the packet by the first fabric module processor and switching the packet to the second fabric module processor for forwarding back to the line card or another line card, and
   when the packet conforms to the second addressing scheme and is received at the first fabric module processor, switching the packet to the second fabric module processor and performing routing on the first packet by the second fabric module processor, and forwarding the packet to the line card or the another line card.

8. The method of claim 7, wherein the packet conforms to the Internet Protocol (IP) v4 addressing scheme, and the method comprises performing IPv4 routing by the first fabric module processor.

9. The method of claim 7, wherein the packet conforms to the Internet Protocol (IP) v6 addressing scheme, and the method comprises performing IPv6 routing by the second fabric module processor.

10. The method of claim 7, further comprising storing exclusively IPv4 routes on the first fabric module processor and storing exclusively IPv6 routes on the second fabric module processor.

11. The method of claim 10, further comprising programming exclusively IPv4 routes on a plurality of first fabric module processors and programming exclusively IPv6 routes on a plurality of second fabric module processors.

12. The method of claim 7, further comprising switching the packet between the first fabric module processor and the second fabric module processor via a trunk line.

13. The method of claim 7, wherein the router comprises a plurality of line cards and a plurality of fabric modules, and enabling each line card to communicate with each fabric module.

14. An apparatus comprising:
a chassis;
a line card, disposed in the chassis; and
a fabric module, disposed in the chassis and in communication with the line card, comprising a routing engine including a memory, the routing engine comprising a first fabric module processor storing routes to route packets conforming to a first addressing scheme and a second fabric module processor storing routes to route packets conforming to a second addressing scheme;
the fabric module configured to, when a packet received at the line card and passed to the fabric module conforms to the first addressing scheme and is received at the first fabric module processor, perform routing on the packet by the first fabric module processor and switch the packet to the second fabric module processor for forwarding back to the line card or another line card, and
the fabric module configured to, when the packet conforms to the second addressing scheme and is received at the first fabric module processor, switch the packet to the second fabric module processor and perform routing on the packet by the second fabric module processor, and forward the packet to the line card or the another line card.

15. The apparatus of claim 14, wherein the first fabric module processor and the second fabric module processor are communicatively coupled via a trunk line.

16. The apparatus of claim 15, wherein the trunk is a 106 gigabit trunk.

17. The apparatus of claim 14, wherein the fabric module comprises two routing engines.

18. The apparatus of claim 17, comprising four fabric modules and eight line cards, wherein each line card comprises a first line card processor and a second line card processor.

19. The apparatus of claim 14, wherein the first addressing scheme conforms to IPv4 and the second addressing scheme conforms to IPv6.

* * * * *